US011925597B1

(12) United States Patent
Vatti

(10) Patent No.: US 11,925,597 B1
(45) Date of Patent: Mar. 12, 2024

(54) MULTI-FUNCTION ADAPTABLE LIFT SYSTEM

(71) Applicant: Bala R. Vatti, Hudson, NH (US)

(72) Inventor: Bala R. Vatti, Hudson, NH (US)

( * ) Notice: Subject to any disclaimer, the term of this patent is extended or adjusted under 35 U.S.C. 154(b) by 0 days.

(21) Appl. No.: 18/114,328

(22) Filed: Feb. 27, 2023

Related U.S. Application Data

(63) Continuation of application No. 15/999,124, filed on Aug. 17, 2018, now Pat. No. 11,607,360.
(Continued)

(51) Int. Cl.
*A61H 3/00* (2006.01)
*A61G 5/00* (2006.01)
(Continued)

(52) U.S. Cl.
CPC ............. *A61H 3/008* (2013.01); *A61G 5/006* (2013.01); *A61G 7/1003* (2013.01); *A61G 7/1007* (2013.01); *A61G 7/1015* (2013.01); *A61G 7/1017* (2013.01); *A61G 7/1019* (2013.01); *A61G 7/1044* (2013.01); *A61G 7/1046* (2013.01); *A61G 7/1049* (2013.01); *A61G 7/1051* (2013.01); *A61G 7/1057* (2013.01); *A61G 7/1059* (2013.01); *A61G 7/1076* (2013.01); *A61G 7/16* (2013.01); *A61H 3/00* (2013.01); *A61H 3/04* (2013.01); *A61G 5/14* (2013.01); *A61G 7/1038* (2013.01); *A61G 2200/327* (2013.01); *A61G 2200/34* (2013.01); *A61G 2200/36* (2013.01); *A61H 2003/001* (2013.01); *A61H 2003/002* (2013.01); *A61H 2201/0149* (2013.01); *A61H 2201/0192* (2013.01); *A61H 2201/1253* (2013.01); *A61H 2201/164* (2013.01); *A61H 2201/1652* (2013.01); *A61H 2201/1671* (2013.01)

(58) Field of Classification Search
CPC . A61H 3/008; A61H 3/00; A61H 3/04; A61H 2003/001; A61H 2003/002; A61H 2201/0149; A61H 2201/0192; A61H 2201/1253; A61H 2201/164; A61H 2201/1652; A61H 2201/1671; A61G 5/006; A61G 7/1003; A61G 7/1007; A61G 7/1015; A61G 7/1017; A61G 7/1019; A61G 7/1044; A61G 7/1046; A61G 7/1049; A61G 7/1051; A61G 7/1057; A61G 7/1059; A61G 7/1076; A61G 7/16; A61G 5/14; A61G 7/1038; A61G 2200/327; A61G 2200/34; A61G 2200/36
USPC ............................................................ 5/86.1
See application file for complete search history.

(56) References Cited

U.S. PATENT DOCUMENTS 1,962,042 A * 6/1934 Stevenson ............ A61G 7/1074 254/327
3,379,450 A * 4/1968 Jones ..................... A61G 5/006 297/DIG. 10
(Continued)

*Primary Examiner* — Justin C Mikowski
*Assistant Examiner* — Luke Hall
(74) *Attorney, Agent, or Firm* — Luis Figarella; John White

(57) ABSTRACT

A lift system has a back panel and a seat panel to provide a seat for a user. The back panel is slidably mounted on a support column via slider so that the back panel can be moved up and down to adjust the seat height. The seat panel can be flipped back to accommodate a user in a standing posture. With the support column, the lift system can be attached to a wheeled frame, a pole, a rotatable arm, a wall or a ceiling depending on the need of the user.

4 Claims, 24 Drawing Sheets

Related U.S. Application Data

(60) Provisional application No. 62/597,443, filed on Dec. 12, 2017, provisional application No. 62/547,787, filed on Aug. 19, 2017.

(51) Int. Cl.

| | |
|---|---|
| ***A61G 5/14*** | (2006.01) |
| ***A61G 7/10*** | (2006.01) |
| ***A61G 7/16*** | (2006.01) |
| ***A61H 3/04*** | (2006.01) |

(56) References Cited

U.S. PATENT DOCUMENTS

| | | | | | |
|---|---|---|---|---|---|
| 3,858,938 | A * | 1/1975 | Kristensson | A61G 5/125 | 297/423.26 |
| 6,125,957 | A * | 10/2000 | Kauffmann | B60L 50/52 | 297/DIG. 10 |
| 6,302,821 | B1 | 10/2001 | Lee | | |
| 6,450,923 | B1 | 9/2002 | Vatti | | |
| 6,619,681 | B2 | 9/2003 | Gutierrez | | |
| 6,851,751 | B1 * | 2/2005 | Romero | A61G 5/1054 | 297/331 |
| 7,585,019 | B2 | 9/2009 | Huang et al. | | |
| 7,611,203 | B1 * | 11/2009 | Roberts | A61G 7/1059 | 297/217.7 |
| 8,104,835 | B2 * | 1/2012 | Ovre | A61G 5/127 | 297/DIG. 10 |
| 8,157,287 | B1 | 4/2012 | Cleveland et al. | | |
| 8,360,518 | B2 | 1/2013 | Braaten | | |
| 9,044,369 | B2 | 6/2015 | Goldfish et al. | | |
| 9,101,520 | B2 | 8/2015 | Goldfish et al. | | |
| 9,149,408 | B2 | 10/2015 | Karlovich | | |
| 9,173,792 | B2 | 11/2015 | Goffer | | |
| 9,333,132 | B2 | 5/2016 | Bruestle et al. | | |
| 9,370,680 | B1 | 6/2016 | Macaulay et al. | | |
| 9,452,096 | B2 | 9/2016 | Jahkel et al. | | |
| 9,649,236 | B1 | 5/2017 | Wike, Jr. et al. | | |
| 9,649,243 | B2 | 5/2017 | Johnson et al. | | |
| 9,682,000 | B2 | 6/2017 | Behnke et al. | | |
| 2003/0011228 | A1 * | 1/2003 | Komura | A61G 7/1074 | 297/344.12 |
| 2012/0280467 | A1 * | 11/2012 | Walther | B62K 5/05 | 280/263 |
| 2016/0184158 | A1 * | 6/2016 | Tu | A61G 7/1059 | 5/87.1 |
| 2018/0021200 | A1 * | 1/2018 | Orndorff | A61H 1/00 | 135/67 |

* cited by examiner

MULTI-FUNCTION ADAPTABLE LIFT SYSTEM

CROSS REFERENCE TO RELATED PATENT APPLICATIONS

This application claims priority to co-pending U.S. Non-Provisional patent application Ser. No. 15/999,124 titled "MULTI-FUNCTION ADAPTABLE LIFT SYSTEM", filed on Aug. 17, 2018, the disclosure of which is herein incorporated by reference in its entirety.

FIELD OF THE INVENTION

The present invention relates to a lift system that can be used in conjunction with mobility, transfer and body weight support devices.

BACKGROUND OF THE INVENTION

There are unfortunately many individuals who have a disability which, whether permanent or temporary, prohibits them from performing their activities of daily living and limits their ability to participate in life-improving therapies. Some of these disabilities include stroke, spinal cord injury, debility due to aging, post-operative weakness, and many other disorders and conditions.

People with disabilities also often require caregivers to transfer them between devices such as wheelchairs, beds, therapy devices, toilets, and bath tubs for their daily activities.

SUMMARY OF THE INVENTION

The present invention provides a lift system that can be attached to a wheeled frame for mobility. It can also be connected to a pole with a rotatable arm for rotation relative to the pole. It can be used to transfer a user from a wheelchair to another supporting frame.

Thus, an aspect of the present invention is a lift system, comprising: a support column; a back panel slidably mounted on the support column, the back panel having a first panel end and a second panel end; a pair of arm supports mounted on the back panel between the first panel end and the second panel end; a seat panel pivotably mounted on the second panel end of the back panel; and a slider mounted between the back panel and the support column for moving the back panel relative to the support column According to an embodiment of the present invention, the lift system also comprises: an attachment joint attached to the support column, and a support member having a first end connected to the attachment joint and a second end arranged for connection to a wheeled frame. (FIG. 19D). According to an embodiment of the present invention, the lift system further comprises: an attachment joint attached to the support column, and a bracket having a first end connected to the attachment joint and a second end arranged for connection to a wheeled frame, wherein the wheeled frame comprises a frame member connected to the second end of the bracket, and the support column can be caused to rotate in a direction perpendicular to the frame member.

According to an embodiment of the present invention, the back panel is adjustable between a first panel position and a second panel position along with the support column, and wherein the seat panel is adjustable between a first seat position and a second seat position relative to the back panel, such that when the back panel is oriented in the first panel position, the seat panel is oriented in the first seat position to support a user in a sitting posture, or the seat panel is oriented in the second seat position to accommodate a user in a standing or walking posture.

According to an embodiment of the present invention, when the back panel is oriented in the second panel position, the seat panel is oriented in the second seat position relative to the back panel to support a user in a lying posture. According to an embodiment of the present invention, the lift system also comprises: a leg support pivotably connected to the seat panel, the leg support adjustable between a folded position and an extended position relative to the seat panel, wherein when the back panel is oriented in the first panel position, the leg support is oriented in the folded position to accommodate the user in the sitting posture or the standing or walking posture, and when the back panel is oriented in the second panel position, the leg support is oriented in the extended position to support the user in the lying posture.

According to an embodiment of the present invention, when the back panel is oriented between the first panel position and the second panel position, the seat panel is oriented between the first seat position and the second seat position to support a user in a reclined posture.

According to an embodiment of the present invention, the arm supports are adjustable between an extended position substantially perpendicular to the back panel and a folded position substantially parallel to the back panel.

According to an embodiment of the present invention, the lift system also comprises: a harness support arm attached to the back panel near the first panel end, and a harness support connected to the harness support arm, the harness support arranged for attachment of a suspension support strap.

According to an embodiment of the present invention, the lift system also comprises: an attachment joint attached to the support column, and a bracket having a first end connected to the attachment joint and a second end arranged for connection to an attachment arm, the attachment arm arranged for mounting the support column along with the back panel to a supporting structure.

According to an embodiment of the present invention, the lift system also comprises: an attachment joint attached to the support column, a bracket having a first bracket end and a second bracket end, the first bracket end connected to the attachment joint; and an attachment arm having a first arm end connected to the second bracket end, and a second arm end pivotably mounted to a supporting structure, allowing the attachment arm and the lift system to be caused to move in a horizontally direction relative to the support structure.

According to an embodiment of the present invention, the lift system also comprises: at least a first attachment joint and second attachment joint separately attached to the support column, the first attachment joint arranged to connect to a support structure, wherein the second attachment joint is arranged to connect to a wheeled frame while the first attachment joint is connected to the support structure.

According to an embodiment of the present invention, the lift system also comprises: at least one actuator connected to the seat panel for facilitating adjustment of the seat panel between the first seat position and the second seat position.

According to an embodiment of the present invention, the lift system also comprises: at least one actuator connected to the leg support for facilitating adjustment of the leg support between the folded position and the extended position.

According to an embodiment of the present invention, the first panel position of the back panel is substantially a vertical position and the second panel position of the back panel is substantially a horizontal position.

According to an embodiment of the present invention, the lift system also comprises: a pair of pivot arms fixedly attached to the back panel; and a pair of brackets, each of the brackets having a first bracket end fixedly mounted to the seat panel and a second bracket end rotatably connected to one of the pivot arms for pivotably mounting the seat panel to the back panel.

According to an embodiment of the present invention, the lift system also comprises: a mounting bracket fixedly attached to the support column; a support member having a first support end pivotably connected to the mounting bracket and a second support end arranged for connection to a wheeled frame, and an actuator having a first actuator end pivotably connected to the mounting bracket and a second actuator end connected to support member, wherein the actuator has an actuator shaft extendable to rotate the support column relative to the support member.

According to an embodiment of the present invention, the lift system also comprises: a lead screw movably connecting the slider to support column, and an actuator connected to the lead screw arranged to move the slider relative to the support column.

According to an embodiment of the present invention, the lift system also comprises: one or more cross members connecting between the slider and the back panel to allow the back panel to move along with the slider relative to the support column.

According to an embodiment of the present invention, the lift system also comprises: a lead screw movably connecting the slider to support column, and an actuator connected to the lead screw arranged to move the slider relative to the support column so as to adjust a height of the lift system relative to the support column.

DETAILED DESCRIPTION OF THE INVENTION

Various embodiments of the present invention include a multifunction adaptable lift system, which can be attached to a mobility device such as a wheeled frame, a mobility frame or a fixed support object like a wall or a pole. The adaptable lift system is also transferable between the mobility devices or the support objects. The lift system can be used as a positioning system or a user positioning system arranged to transfer a user from one location to another location.

Figure 1A:
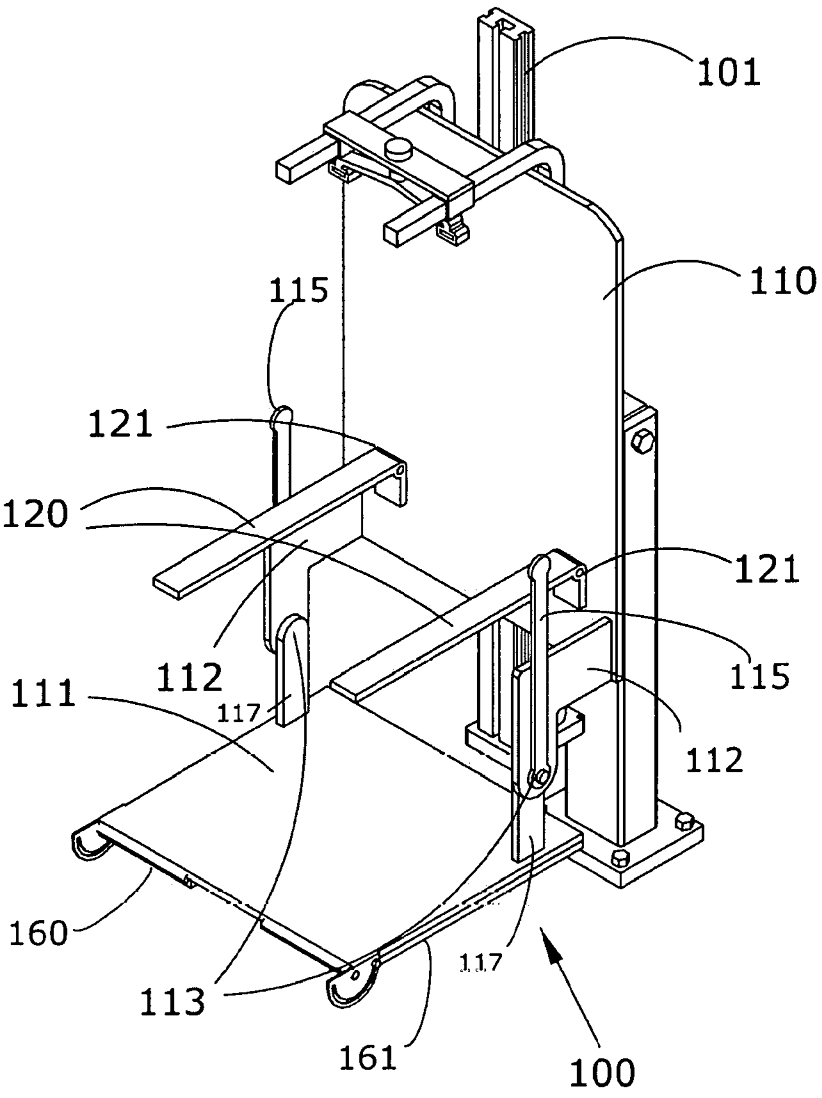
FIG. 1A is a front view of a lift system, according to an embodiment of the present invention.
Figure 1B:
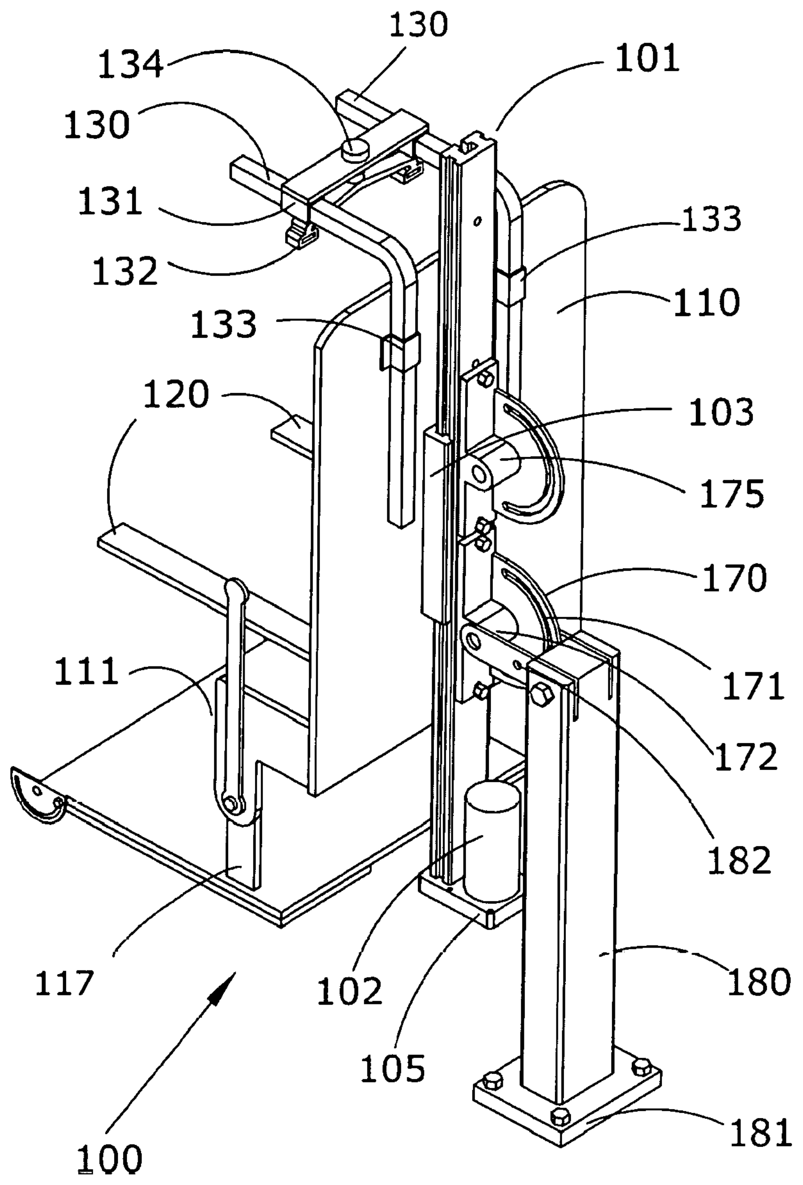
FIG. 1B is a rear view of the lift system.

FIG. 1A shows a front view of the adaptable lift system 100 adjusted to a sitting position in accordance with an embodiment of the invention. FIG. 1B shows a rear view of the lift system. As seen in FIGS. 1A and 1B, the lift system 100 includes a support column 101 with a lead screw (see FIG. 17B) driven by a motorized drive mechanism in the drive housing 102. A slider 103 slidably mounted on the support column 101 for up and down movement in a range to support a user's position from a sitting posture to a standing posture. A bottom mounting plate 105 is an auxiliary mounting point for the lift system 100. There can also be multiple mounting points along the height of the support column 101 including mid-points along the column as shown in FIG. 1B.

A rigid back panel 110 is attached to the slider 103 for movement relative to the support column 101. The back panel 110 can also be a frame. A rigid seat panel 111 is pivotally attached to the back panel 110 via a pair of brackets 117 using pivot arms 112 and pivot joints 113. The axis of the pivot joint 113 aligns approximate to the axis passing through the user's hip joints and thus allows natural movements of the legs.

A pair of levers 115 provide the rotational movement of the seat panel 111 about joint 113. The levels 115 can be used to lock the seat panel between a first panel position and a second panel position. The first panel position is used to support a user in a sitting posture (see FIG. 3) and the second panel position allows a user in a standing posture (see FIG.

4). The levers 115 and the seat rotation may further include a ratcheting mechanism (not shown) for ease of use. A pair of arm supports 120 are attached to the back panel 110 at a position convenient to the user. The arm supports 120 can also be folded at the pivotal joints 121 and kept out of the way when they are not in use. The arm supports 120 can also be made to retract behind the back panel 110 by sliding the arm supports 120 through a slot (not shown) in the back panel to get them out of the way when not in use. Thus, the arm supports 120 are adjustable between an extended position and a folded position.

A pair of left and right inverted L shaped harness support arms 130 are mounted to the back panel 110. The harness support arms 130 are slidable parallel to the column 101 and lockable using a pair of harness support arm brackets 133. A harness hanger 131 is slidably attached to the segments of the harness support arms 130 perpendicular to the back panel 110. A lower harness hanger 132 is pivotally attached to the harness hanger 131 so that a user sL1pport harness or harness suspension strap 191 (see FIG. 3) can be attached thereto. As such, a user can be rotated along the vertical axis through the pivot 134 when suspended by the user support harness 191.

A right leg panel 160, and a left leg panel 161 pivotably attached to the seat panel 111. As shown in FIG. 1A, the right leg panel 160 and the left leg panel 161 are in a folded position. Left and right sides referenced herein are defined with respect to the user facing away from the back panel 110 while using the lift. The leg panels 160, 161 are adjustable between a folded position and an extended position (see FIGS. 6 and 7).

As seen in FIG. 1B, a lift attachment joint 172 is attached to the support column 101. A lift attachment arm 180 is pivotably attached to the lift attachment joint 172 via a lift attachment bracket 182 so as to provide rotation movement of the support column 101 along with the back panel 110. The lift system 100 may also have a mounting plate 181 for mounting the lift system 100 to an external support system. The lift attachment joint 172 includes an anchoring plate 171 with a semicircular slot 170 for locking rotational movement of the support column 101 about the lift attachment joint 172. The lift attachment joint 172 can be attached at different positions along the column 101, and the axis of rotation movement about the joint 172 is shifted accordingly.

In addition to joint 172, one or more lift attachment joints 175 can be attached to the column 101. Different type of joints can provide different functions. For example, lift rotation can be made about an axis with different orientation. As seen in FIG. 1B, a second lift attachment joint 175 similar to the lift attachment joint 172 for use in transferring the lift system 100 from one device or object to another device or object (see FIG. 5).

Figure 2:
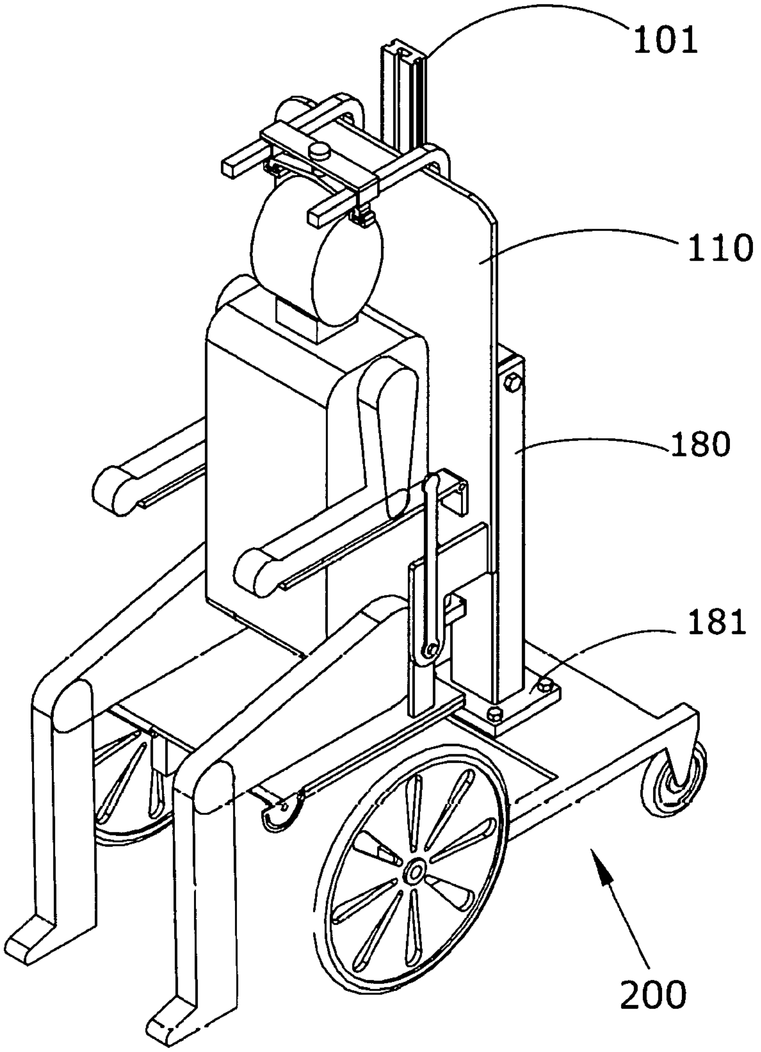
FIG. 2 illustrates the lift system mounted on a wheeled frame with a user in a sitting posture.

FIG. 2 illustrates the lift system 100 mounted on a wheeled frame 200 with a user sitting on the lift system 100. As seen in FIG. 2, the lift attachment arm 180 is fixedly mounted on the wheeled frame 200 via the mounting plate 181.

Figure 3:
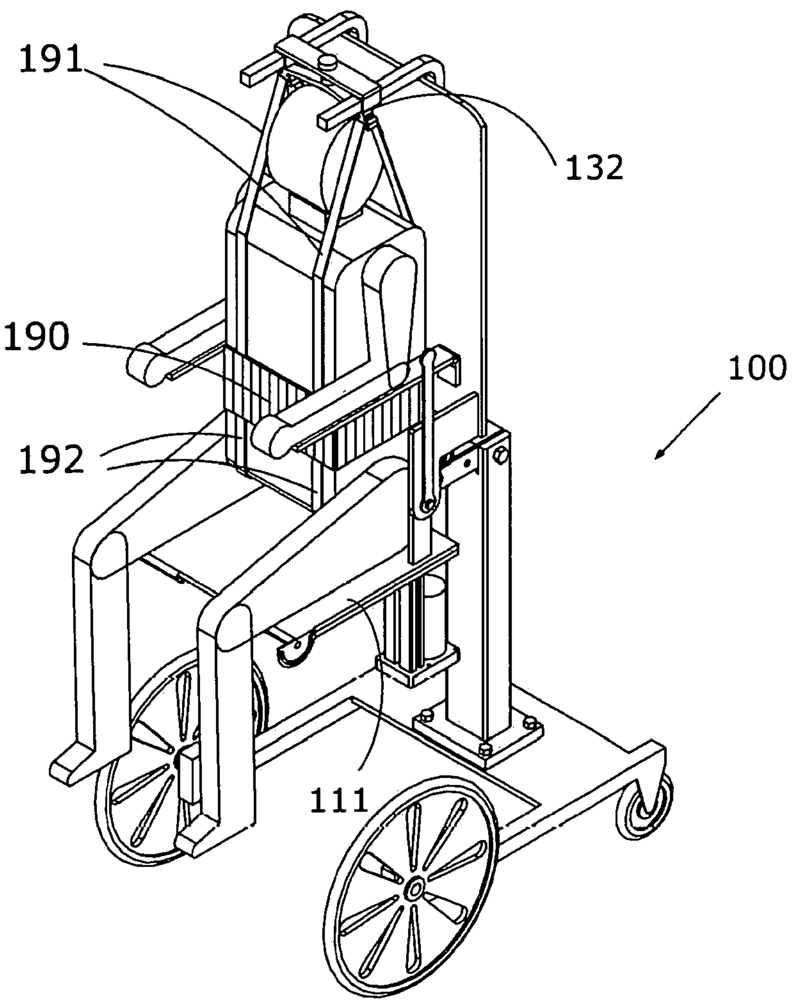
FIG. 3 illustrates the lift system having a harness suspension strap to support a user in a sitting posture.
Figure 4:
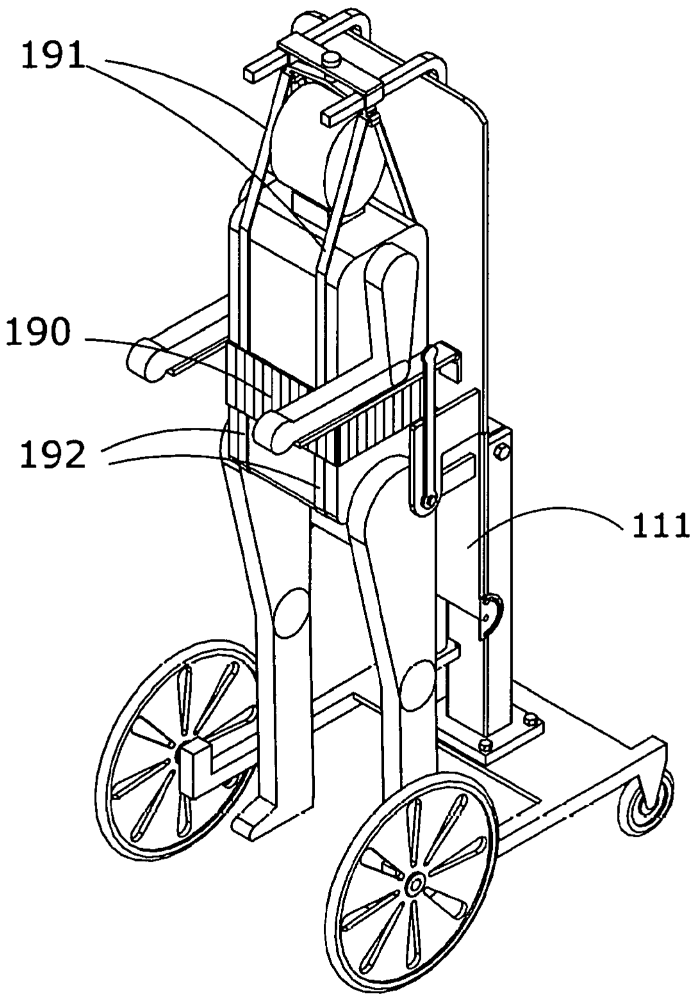
FIG. 4 illustrates the lift system having a harness suspension strap to support a user in a standing posture.

FIG. 3 illustrates a pair of harness suspension straps 191 along with a harness torso support band 190 and harness bottom support straps 192 being attached to the lower harness hanger 132 to support a user in a sitting posture. The lift system 100 is in a raised position as compared to lift system 100 in FIG. 2. With the user being supported by the straps 191, 192, the seat panel 111 can be flipped back away from the user as shown in FIG. 4. The height of the lift system 100 can be adjusted to accommodate the user in a standing posture. In FIG. 3, the back panel 110 is shown to be in an upright position and the seat panel 111 is in a first seat position relative to the back panel 110 to support the user in a sitting posture. In FIG. 4, the seat panel 111 is in a second seat position to accommodate the user in a standing posture.

Figure 5:
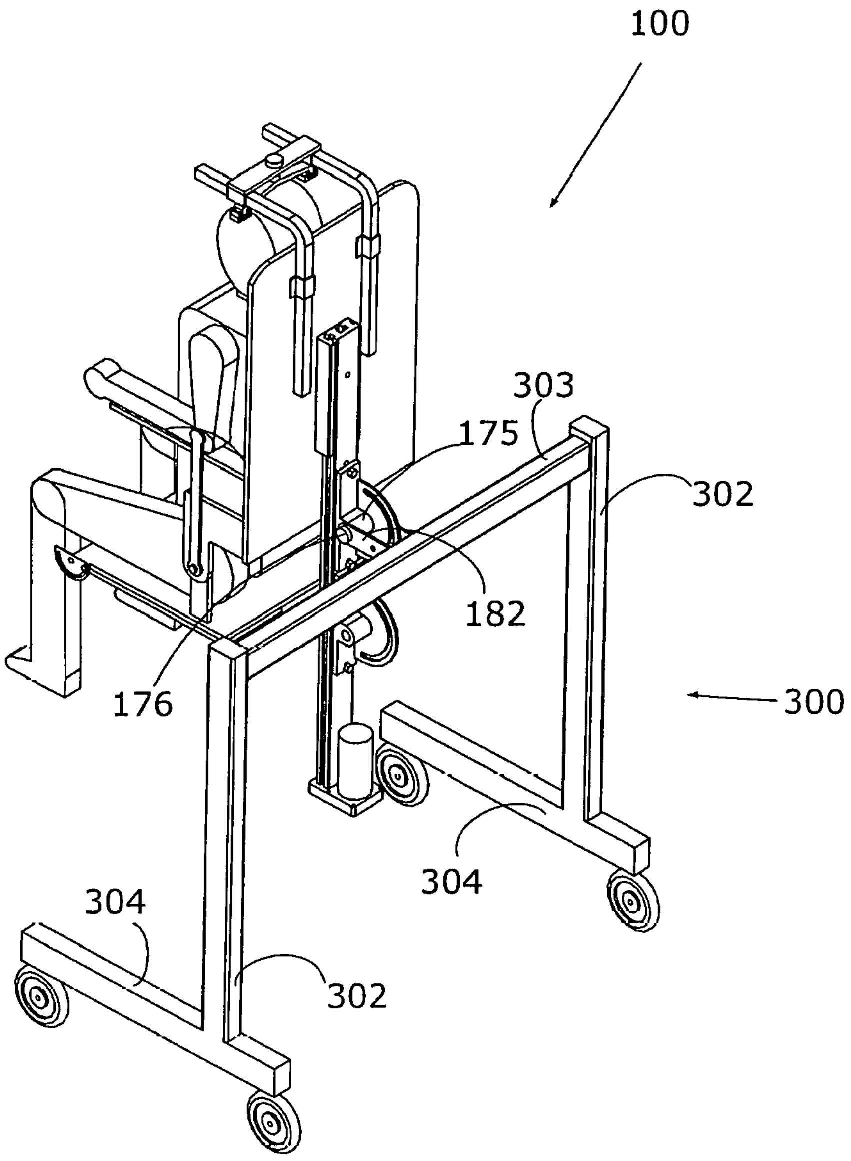
FIG. 5 illustrates the lift system mounted on a mobile frame arranged to support a user in a sitting posture.

According to the present invention, the lift system 100 can be transferred to a mobile frame 300 while the lift system 100 is attached to the wheeled frame 200. After the lift system 100 is secured to the mobile frame 300, the wheeled frame 200 can be removed. As shown in FIG. 5, the mobile frame 300 includes a lift attachment bracket 182 attached to a frame member 303 supported by two columns 302 over base members 304 on wheels. The lift attachment bracket 182 is rotatably attached to the lift attachment joint 175.

Figure 6:
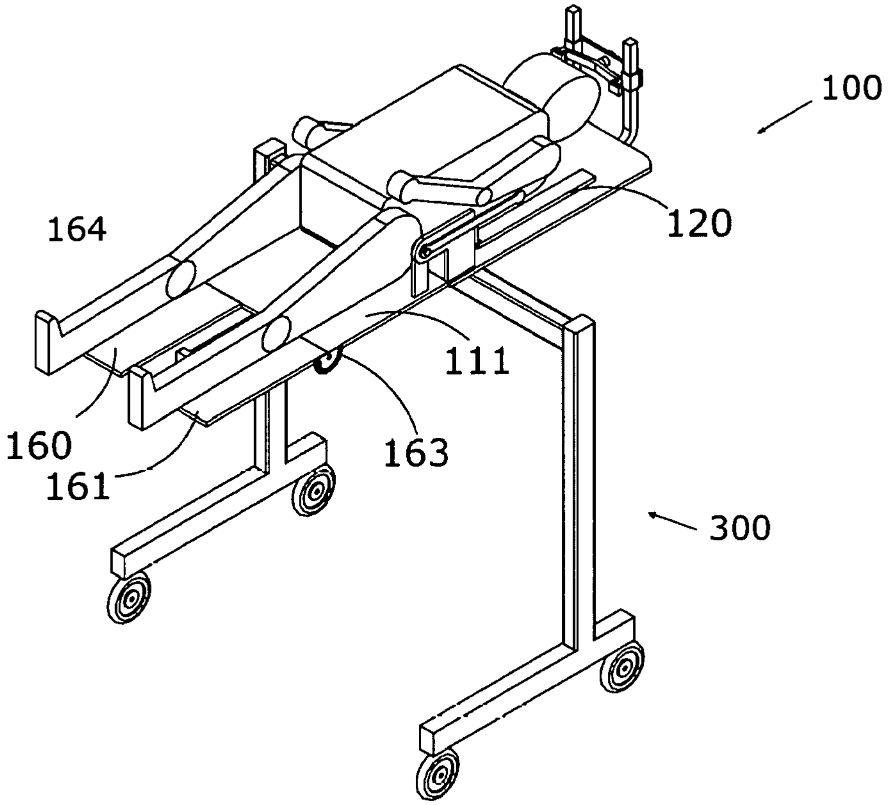
FIG. 6 illustrates the lift system mounted on a mobile frame arranged to support a user in a lying posture.

FIG. 6 illustrates the lift system 100 attached to the mobile frame 300 is used to support a user in a lying posture by rotating the lift system 100 about the lift attachment joint 175 (see FIG. 5). As shown in FIG. 6, the right leg panel 160, and the left leg panel 161 are unfolded by rotating about the right and left leg panel hinges 164 and 163. The right leg panel 160 and the left leg panel 161 can be locked in position using the semicircular slots of the hinges 164 and 163. The right and left leg panels 160, 161 can be rotated and locked at any desired position.

The arm supports 120 can be folded back against the back panel 110 to keep them out of the way in the supine position. In FIG. 6, the back panel 110 is a substantially horizontal position and the seat panel 111 is in a second position relative to the back panel 110 to support the user in a lying posture. The leg panels 160, 161 are in an extended position to support the legs. The leg panels are also referred to as leg supports.

Figure 7:
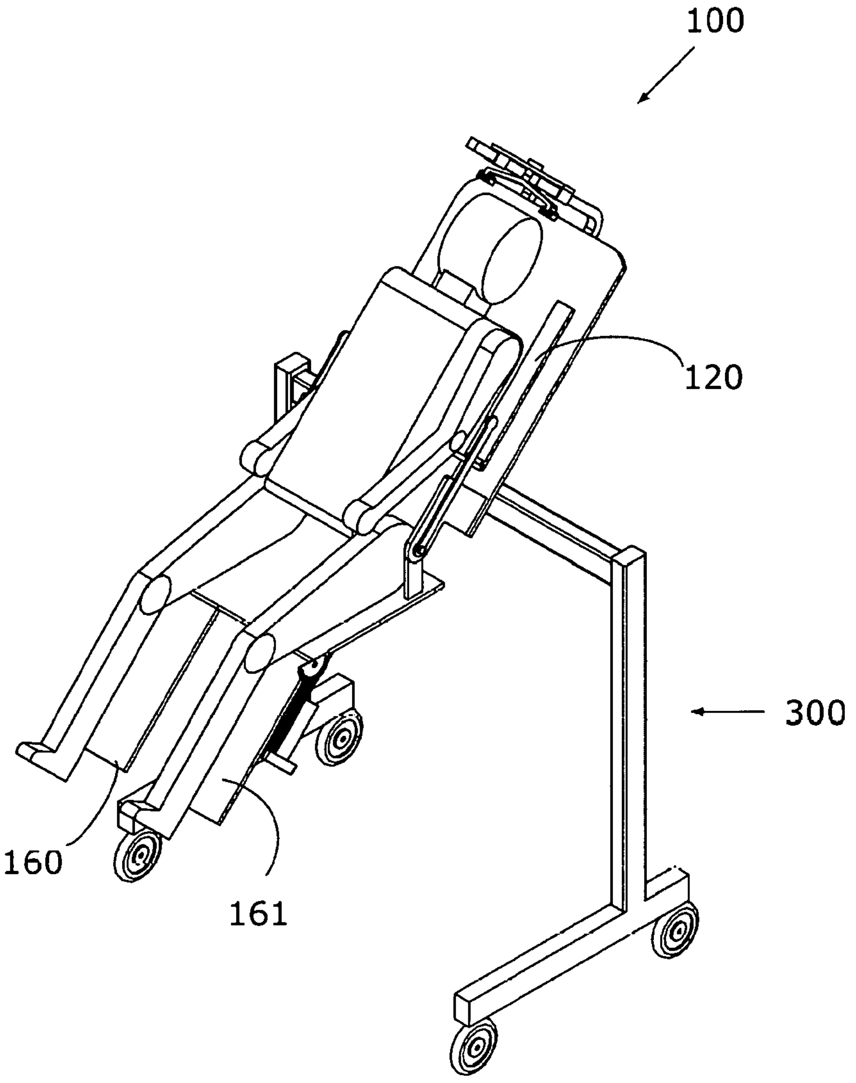
FIG. 7 illustrates the lift system mounted on a mobile frame arranged to support a user in a reclining posture.

FIG. 7 illustrates the lift system 100 is rotated to support a user in a reclining position with both the arm supports 120 folded back and the leg panels 160 and 161 adjusted to support the legs in a reclining position.

Figure 8:
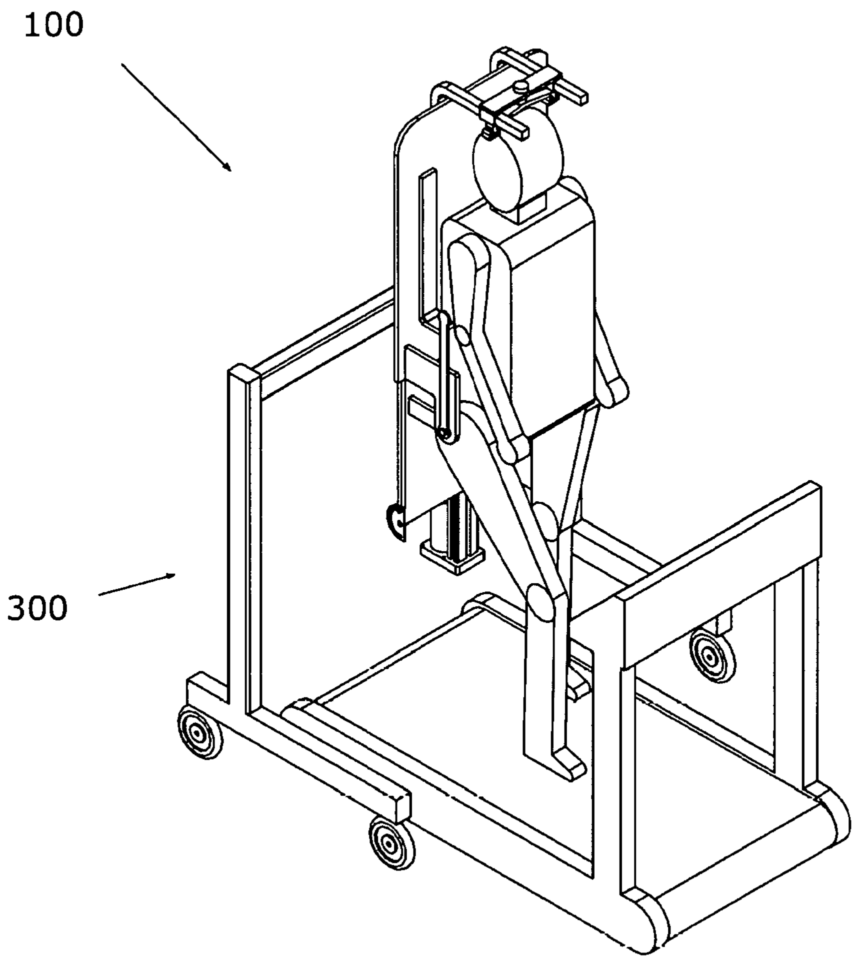
FIG. 8 illustrates the lift system mounted on a mobile frame arranged to support a user in a walking exercise.
Figure 9:
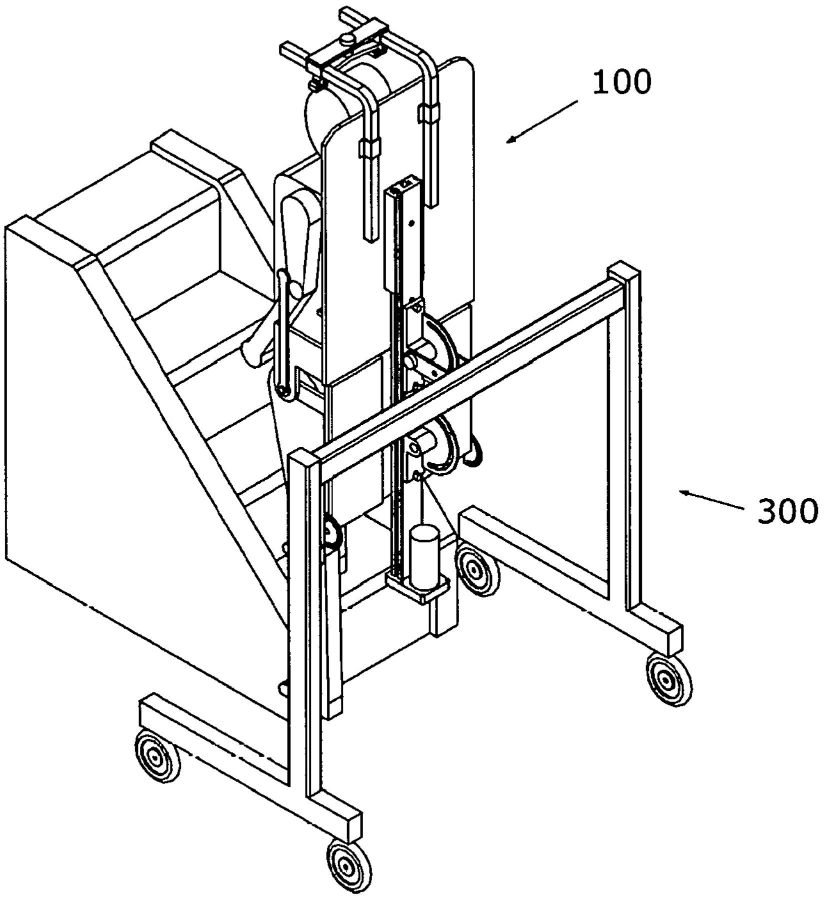
FIG. 9 illustrates the lift system mounted on a mobile frame arranged to support a user in a step climbing exercise.
Figure 10:
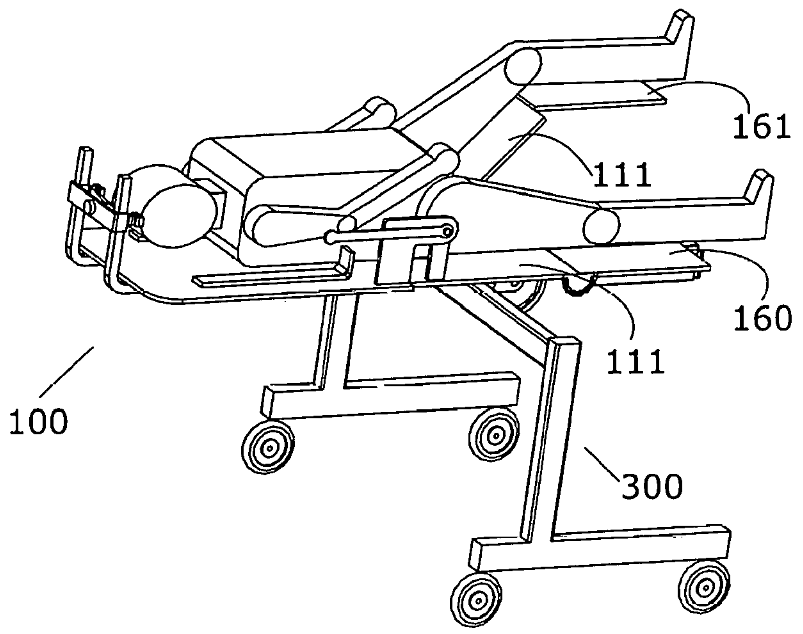
FIG. 10 illustrates the lift system mounted on a mobile frame with split seat panel for individually adjusting the leg positions of a user in a lying posture.

FIG. 8 shows a user exercising on a treadmill supported by the lift system 100 attached to the mobile frame 300. FIG. 9 shows a user exercising on a stepper machine supported by the lift system 100 attached to the mobile frame 300. According to an embodiment of the present invention, the seat panel 111 can be split into left and right halves. As shown in FIG. 10, the left and right halves of the seat panel 111 split into left and right halves can be independently adjusted to position the left and right panels 160, 161.

Figure 11B:
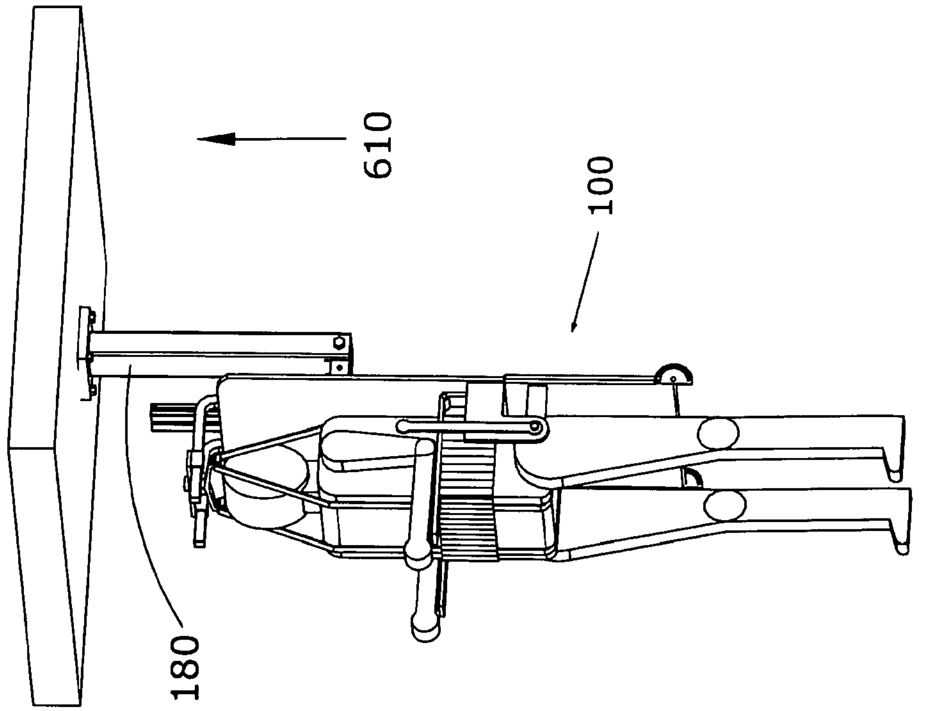
FIG. 11B illustrates the lift system mounted on a ceiling arranged to support a user in a standing posture.
Figure 11A:
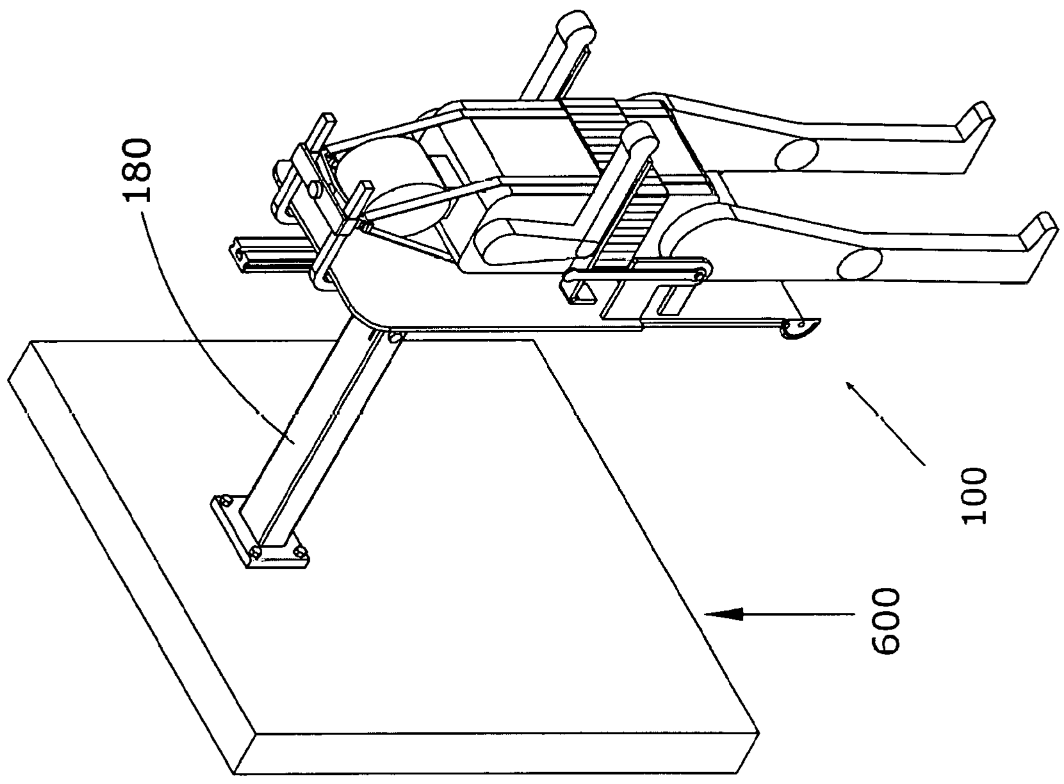
FIG. 11A illustrates the lift system mounted on a wall arranged to support a user in a standing posture.

FIG. 11A shows the lift system 100 attached to a wall 600 via the lift attachment arm 180. FIG. 11B shows the lift system 100 attached to a ceiling 610 via the lift attachment arm 180. These configurations provide increased access to the patient's lower limbs for treatment by therapists.

Figure 12A:
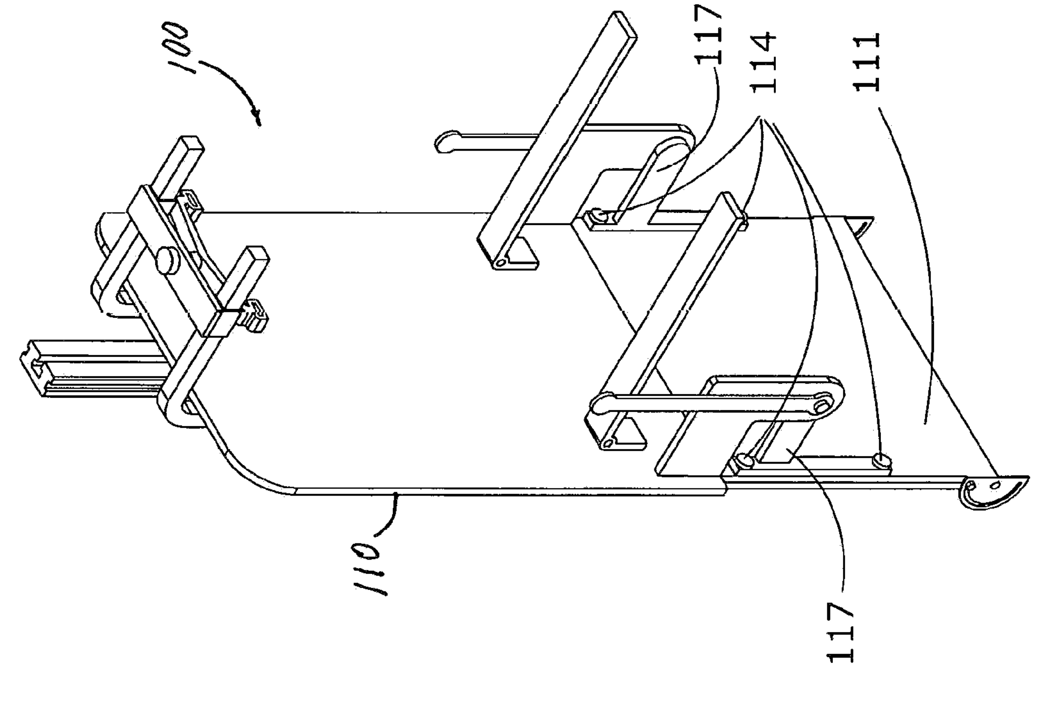
FIG. 12A illustrates the lift system with the seat panel in a flipped back position.
Figure 12B:
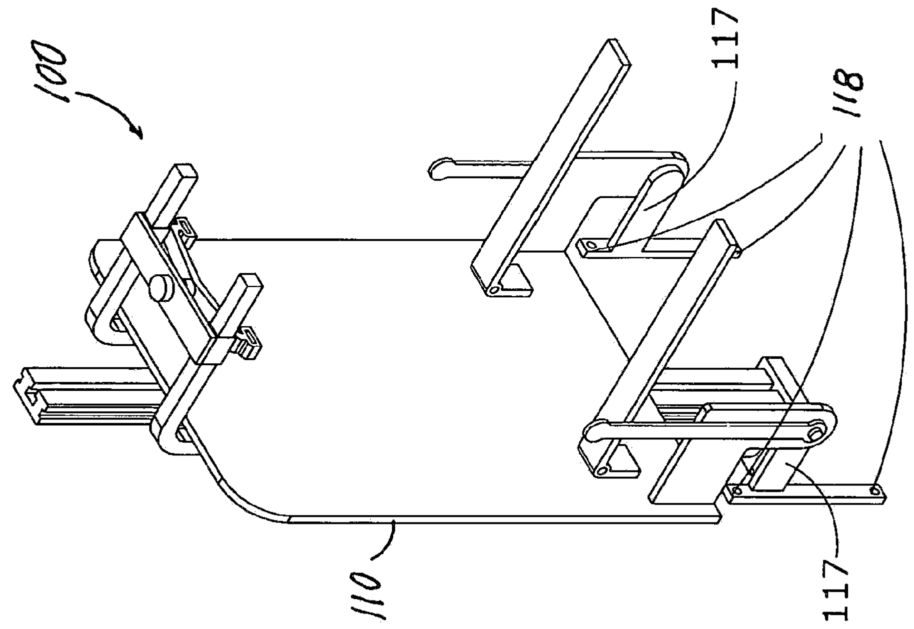
FIG. 12B illustrates the lift system with the seat panel removed.

FIG. 12A and FIG. 12B show a removable seat panel mechanism for increased access to a user's lower limbs for therapists as well as certain user activities such as bathing and toileting. As seen in FIG. 12A, the seat panel 111 of the lift system 100 is attached to the back panel 110 using the brackets 117 which are secured to the seat panel 111 using knobs 114. FIG. 12B shows the lift system 100 after the seat panel 111 has been removed. The seat panel mounting holes 118 of brackets 117 are shown.

Figure 13:
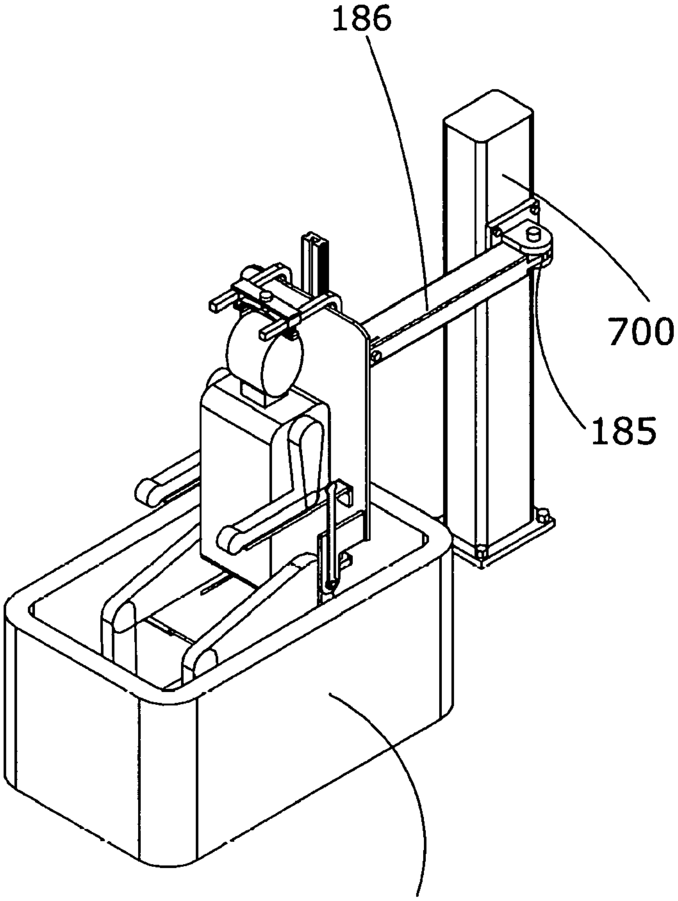
FIG. 13 illustrates the lift system mounted on a post with a rotatable arm.

FIG. 13 shows the lift system 100 being transferred to a pole 700 with a rotating lift arm 186. The rotating lift arm 186 is rotatable about the vertical axis of pivot joint 185. The rotating lift arm 186 can be used to place a user in bath tub 710 or over a commode, for example.

Figure 14A:
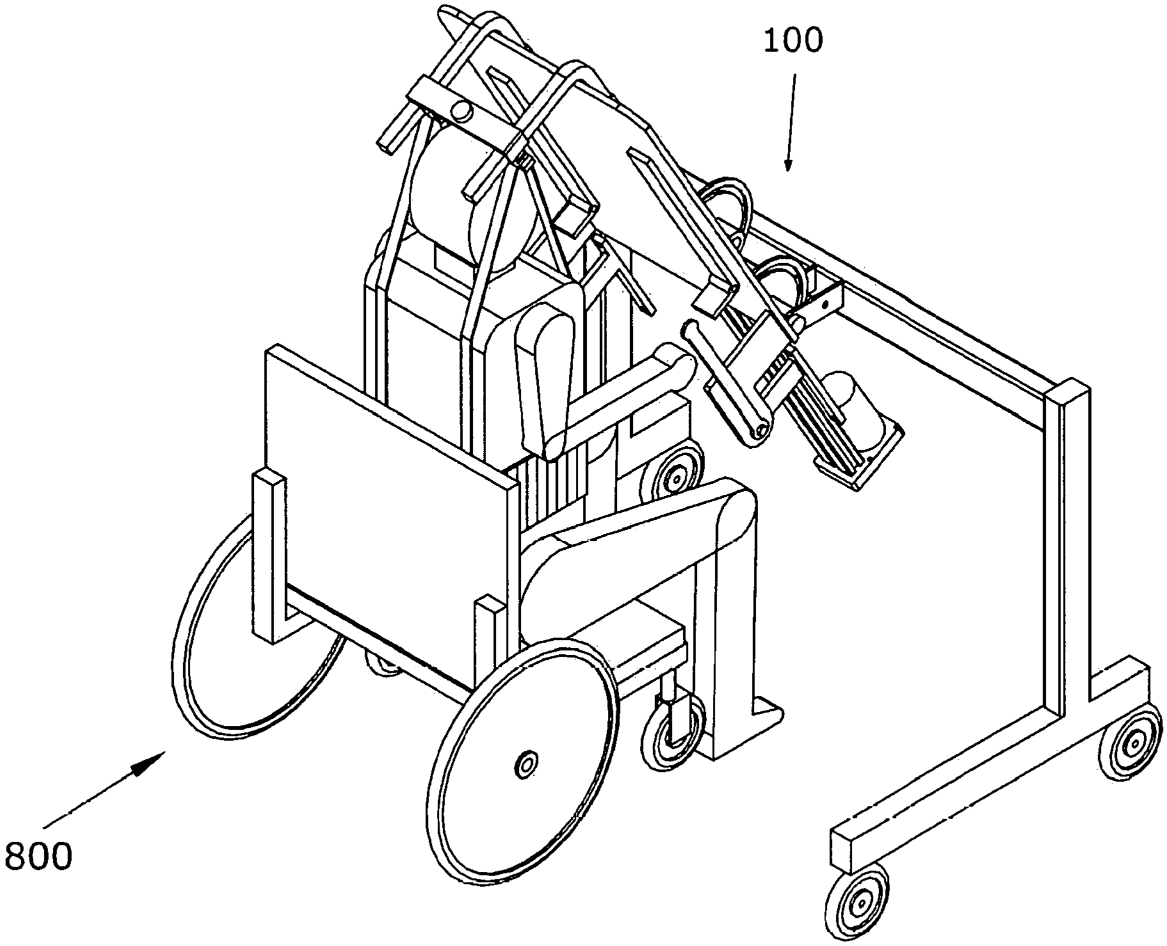
FIG. 14A illustrates the lift system arranged to transfer a user sitting on a conventional wheelchair to a mobile frame.
Figure 14B:
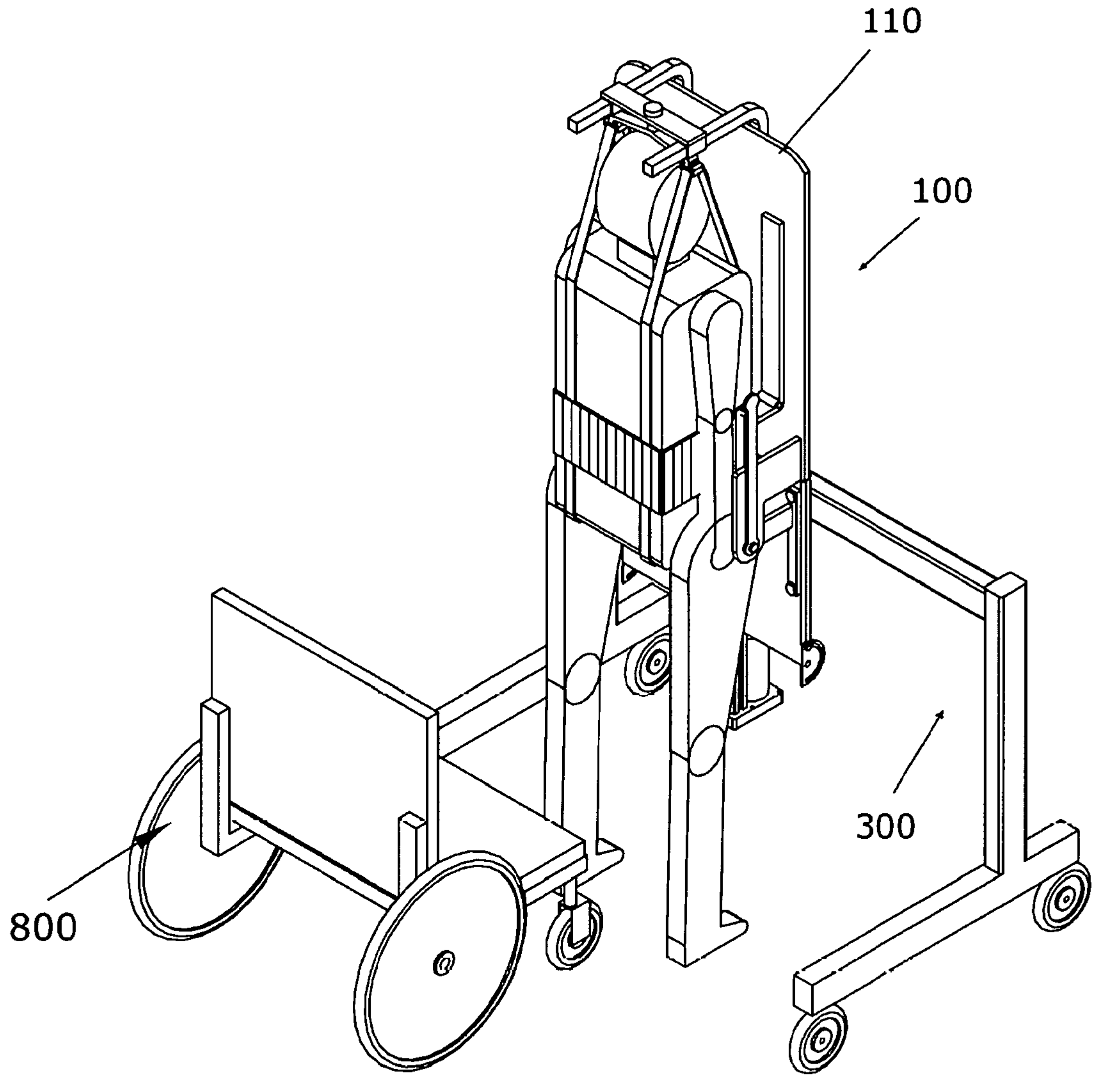
FIG. 14B illustrates the lift system after lifting the user from the conventional wheelchair.
Figure 14C:
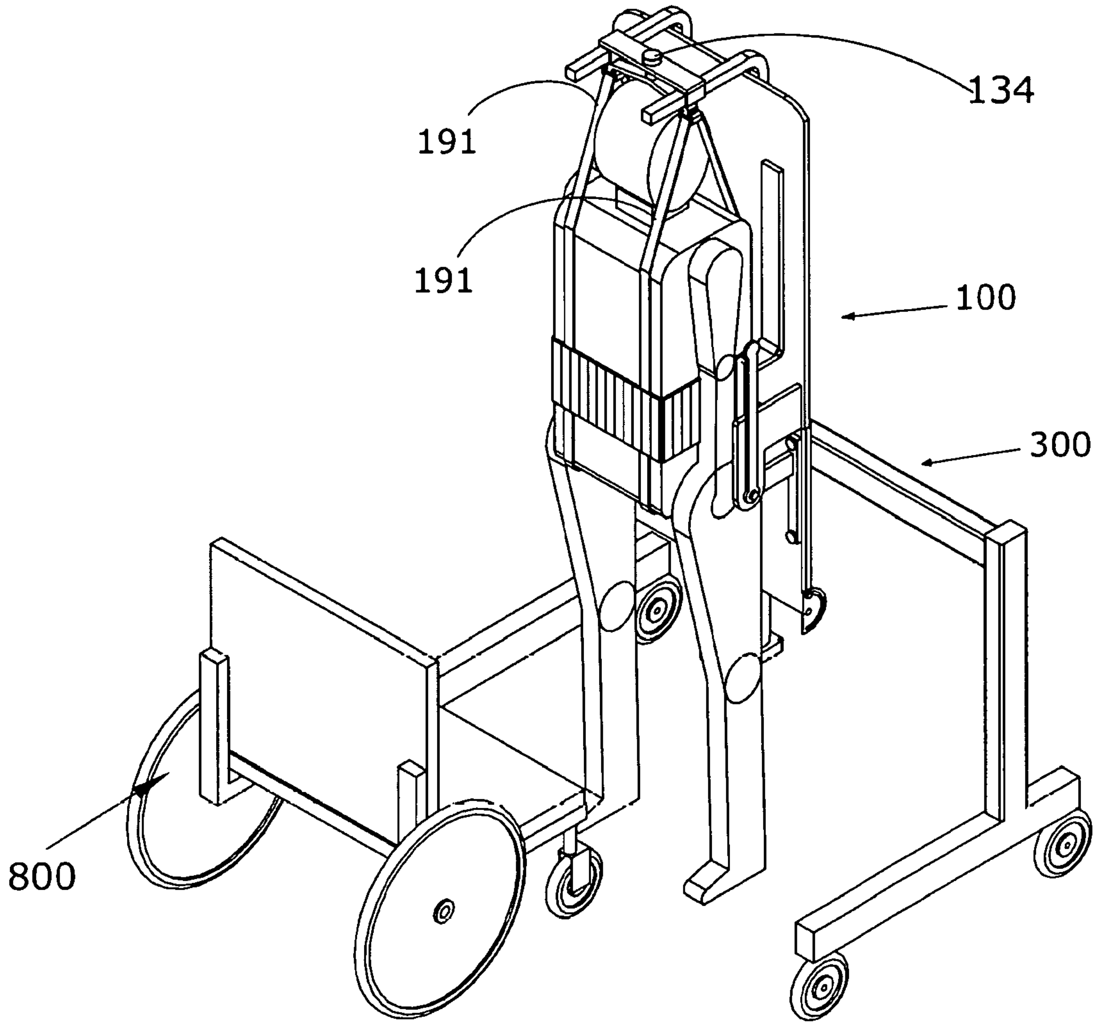
FIG. 14C illustrates the lift system after rotating the user to face away from the back panel.
Figure 14D:
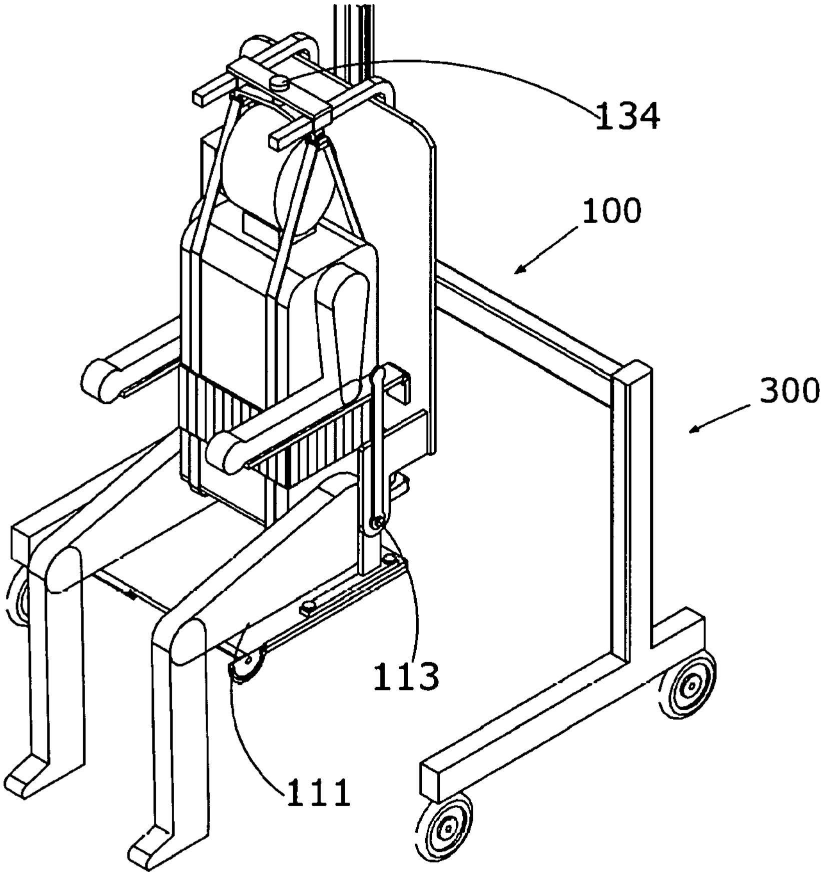
FIG. 14D illustrates the lift system arranged to support the user in a sitting posture.

FIGS. 14A, 14B, 14C and 14D show how a user can be transferred from a conventional wheelchair 800 to the lift system 100. As shown in FIG. 14A, the lift system 100 is mounted on the mobile frame 300 and the lift system 100 is rotated to secure a user supported by harness suspension straps 191. As seen in FIG. 14B, the user is lifted and brought to a standing position by rotating the lift system 100 to its vertical orientation with the user facing the back panel 110. The user can be rotated about the harness hanger pivot 134 to face away from the back panel 110, as shown in FIG. 14C. The user can be brought to a sitting position as shown in FIG. 14D, with the seat panel 111 being rotated about the pivot joints 113 to allow the user to sit.

Figure 15B:
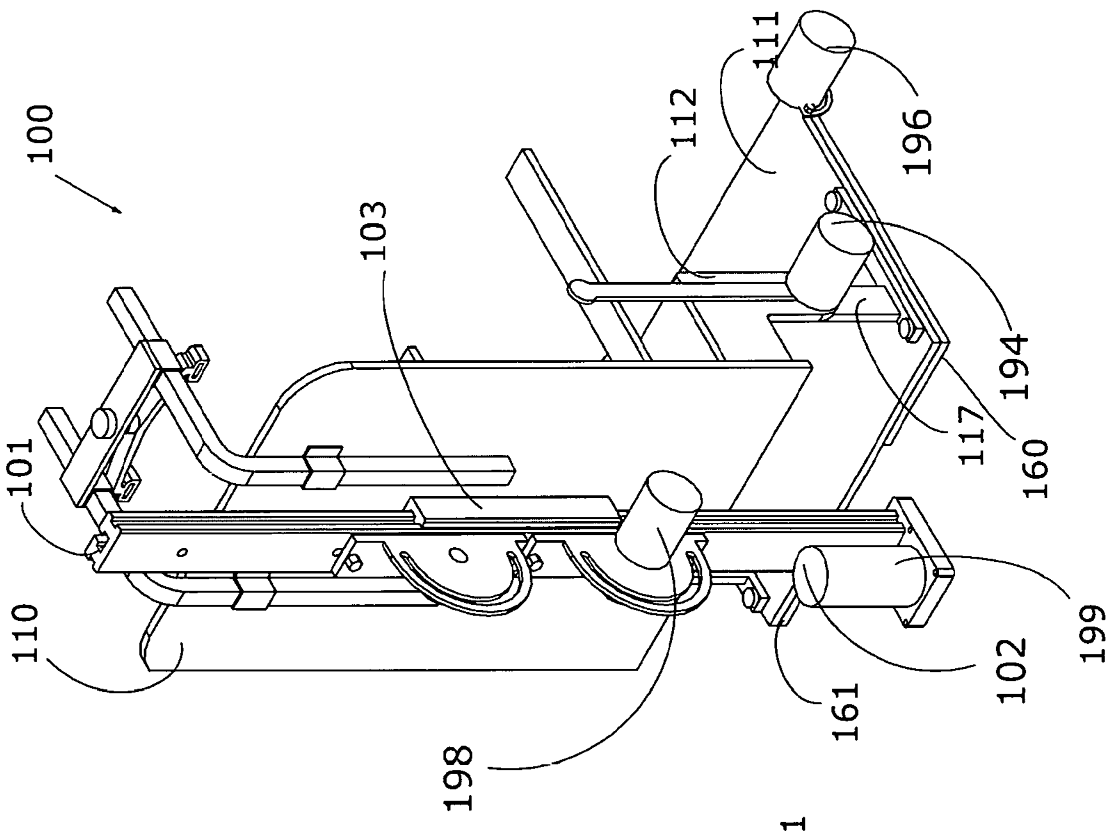
FIG. 15B illustrates a rear view of the lift system with adjustment components.
Figure 15A:
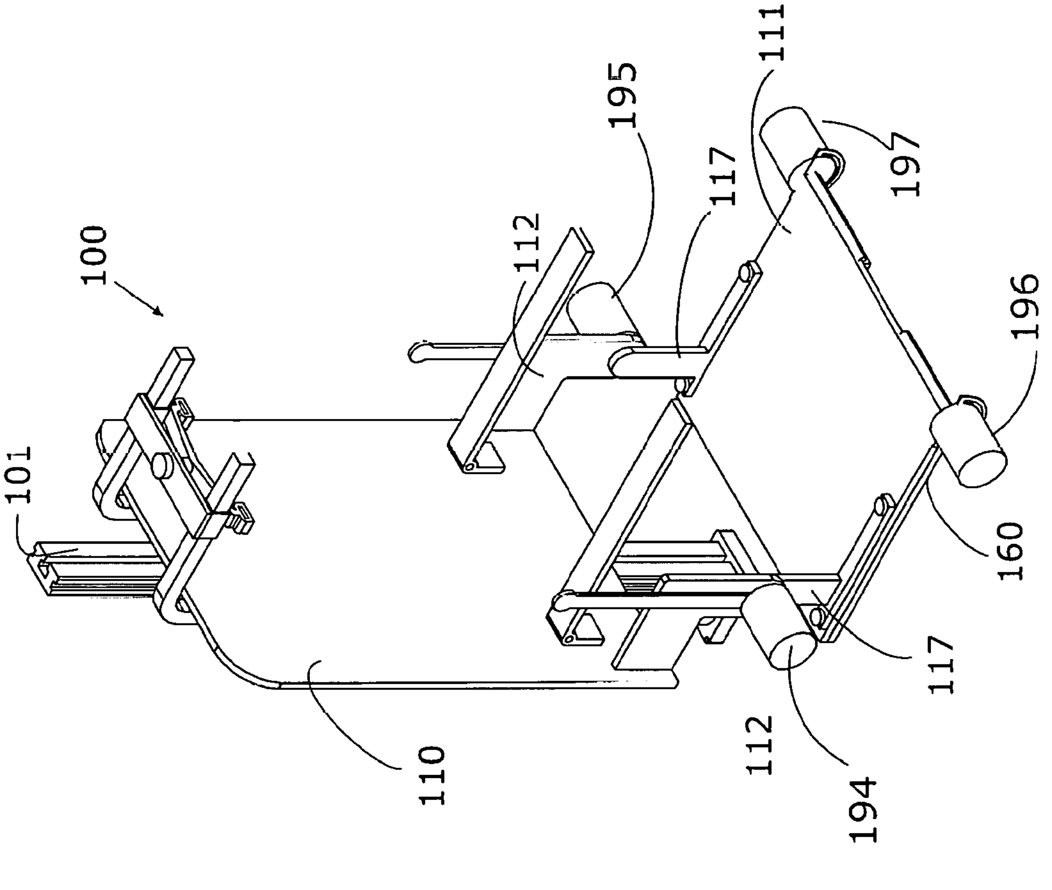
FIG. 15A illustrates a front view of the lift system with adjustment components.

FIGS. 15A and 15B show a motorized mechanism for rotating various parts of the lift system 100, according to an embodiment of the present invention. As shown in FIGS. 15A and 15B, the lift system 100 has a tilt actuator 198 arrange to rotate the support column 101 along with the back panel 110 against a supporting structure or frame; a lift actuator/motor 199 in the drive housing 102 arranged to drive a lead screw 106 (see FIG. 17B) which is coupled to the slider 103 for moving the back panel 110 along with the seat panel 111 relative to the support column 101; and a pair of seat panel actuators 194, 195 connected to the pivot arms 112 and brackets 117 for adjusting the angular position of the seat panel 111 relative to the back panel 110. The lift system 100 also has a pair of leg panel actuators 196, 197 at the front edge of the seat panel 111 for adjusting the angular position of the right leg panel 160 and left leg panel 161 relative to the seat panel 111.

Figure 16:
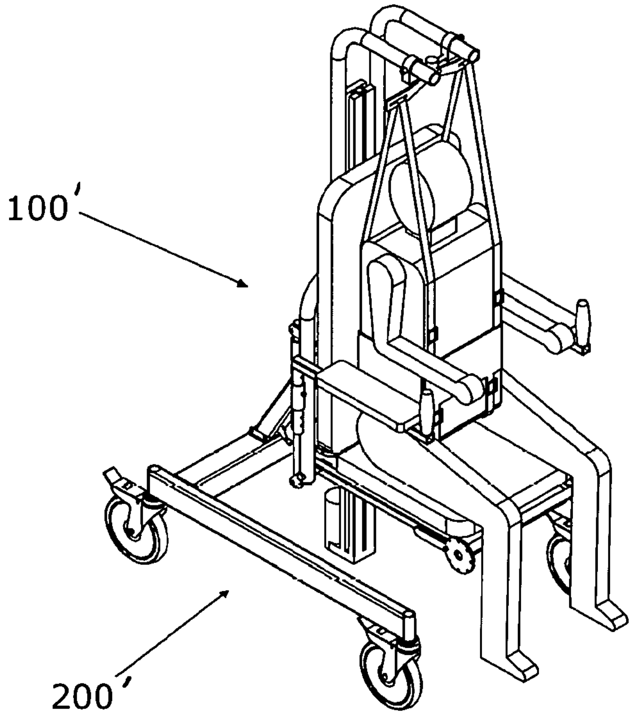
FIG. 16 illustrates a lift system with a wheeled frame, according to another embodiment of the present invention.
Figure 17B:
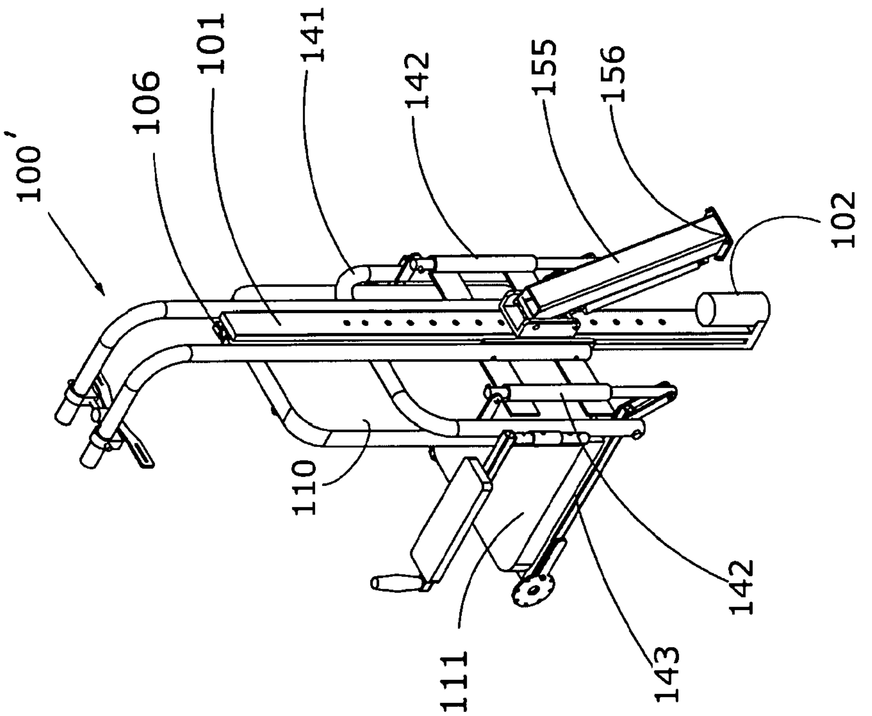
FIG. 17B illustrates a rear view of the lift system.
Figure 17A:
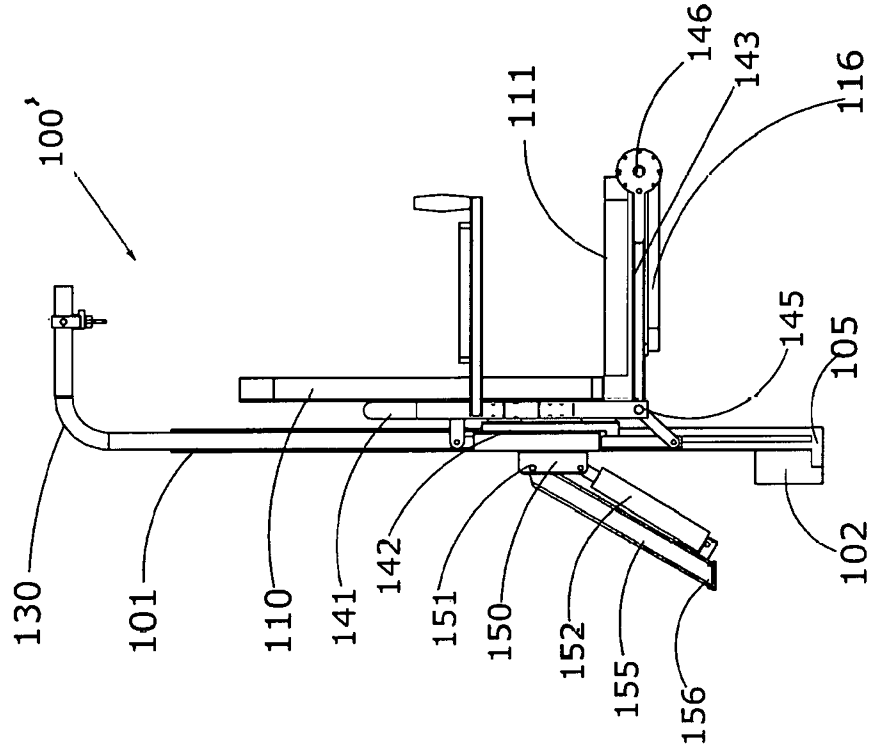
FIG. 17A illustrates a side view of the lift system of FIG. 16.
Figure 18:
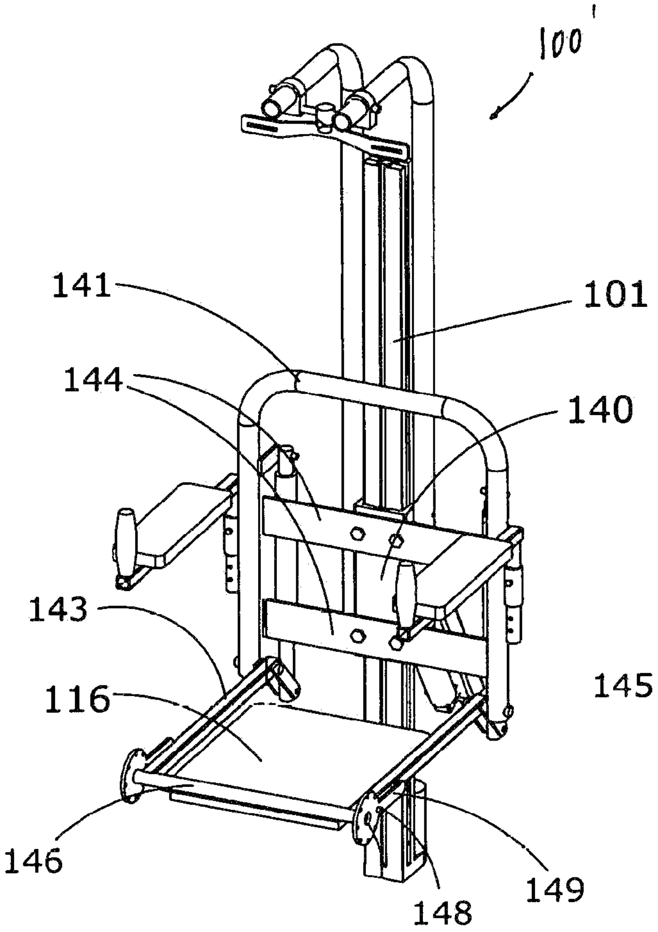
FIG. 18 illustrates a front view of the lift system with the seat panel and the back panel removed.

FIG. 16 illustrates a lift system with a wheeled frame, according to another embodiment of the present invention. As shown in FIG. 16, the lift system 100' is mounted on a wheeled frame 200' for mobility. The details of the lift system 100' are shown in FIGS. 17A, 17B and 18. As shown in FIGS. 17A, 17B and 18, the lift system 100' has a seat frame 143 supporting a seat panel 111 for a user to sit on, a back frame 141 supporting a back panel 110 for a user to lean back against. The back edge of the seat frame 143 is pivotally connected to the bottom edge of the back frame 141 about seat pivotal joints 145.

The angle between the back panel 110 and the seat panel 111 is controlled by one or more seat actuators 142. The seat panel 111 is substantially perpendicular to the back panel 110 when the seat actuator 142 Is extended, and the seat front is dropped and substantially parallel to the back panel 110 when the seat actuator is retracted. The lift system 100' also has a leg rest 116 pivotably connected to the front edge of the seat frame 143. The leg rest 116 can be a single panel to support two legs of a user, but it can also be two independently adjustable flaps 160, 161 as shown in FIG. 10.

The support column 101 of the lift system 100' is pivotally connected to an attachment support member 155 via a bracket 150 about a pivot 151. A linear actuator or column actuator 152 connected to the bracket 150 is used to control the angle of rotation of the support column 101 with respect to the attachment support member 155. When the support column 101 is tilted or rotated using the column actuator 152, the back panel 110, the seat 111, and the leg rest 116 are also rotated along with the support column 101. When the column actuator 152 is retracted, the support column 101 is substantially vertical.

When the column actuator 152 is extended the support column 101 is substantially horizontal. The attachment tie plate 156 is used to secure the lift system 100' to a wheeled frame 200' or a support object. The tie plate 156 may have pivotal joints or the like to assist the mounting of the lift system 100' to a support object such as a pole. The support column 101 also has a lead screw 106 coupled to a slider 140 for moving the seat frame 143 and the back frame 141 relative to the support column 101 using a drive housing 102.

FIG. 18 shows the lift system 100' without the seat panel 111 and the back panel 110. As shown in FIG. 18, the slider 140 is connected to slider cross members 144 is used to move the back frame 141 to move along the support column 101 as the lead screw 106 is driven by the drive housing 102. The seat frame 143 is pivotally attached to the back frame 141 at seat pivot joints 145 in order to facilitate change of angle of the seat panel 111 with respect to the back panel 110. A back edge of a leg rest 116 for supporting the user's legs is pivotally attached to a front edge of the seat frame 143, and can be rotated about a pivot axle 146. The leg rest 116 can be adjusted to different positions using a lever 149 with a lockable disk. The leg rest 116 can be locked at a desired position by means of a locking pin 148. The leg rest 116 can also be rotated using actuators or other powered devices.

Figure 19A:
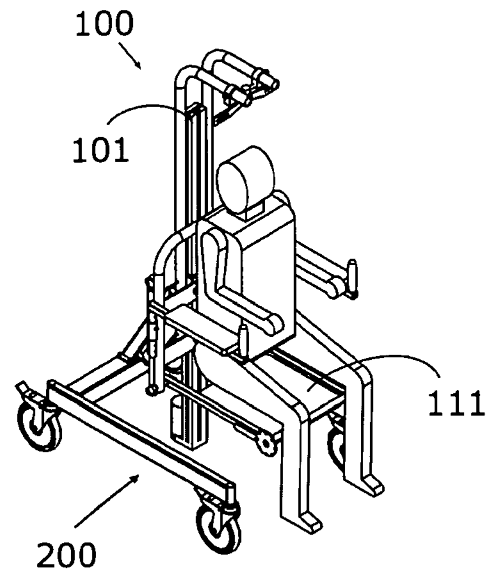
FIGS. 19A-19D illustrate the height adjustment of the lift system.
Figure 19B:
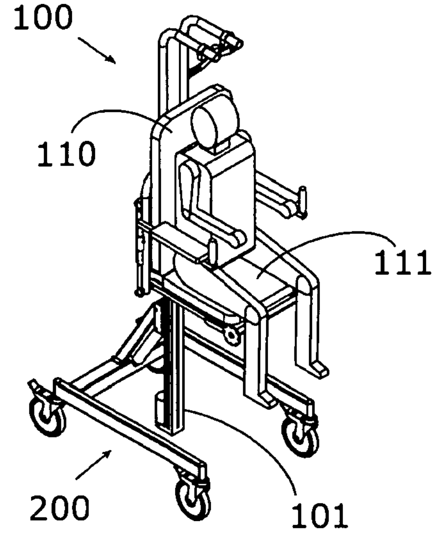
Figure 19C:
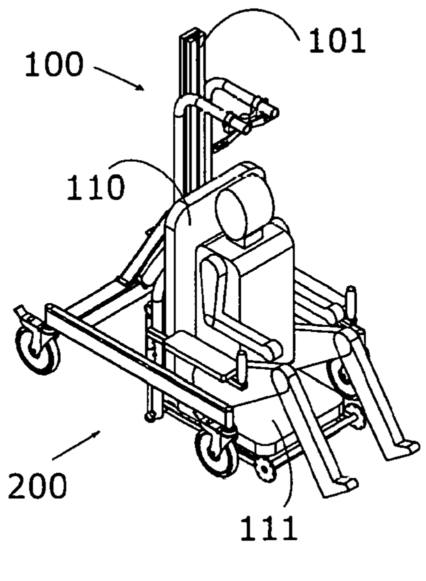
Figure 19D:
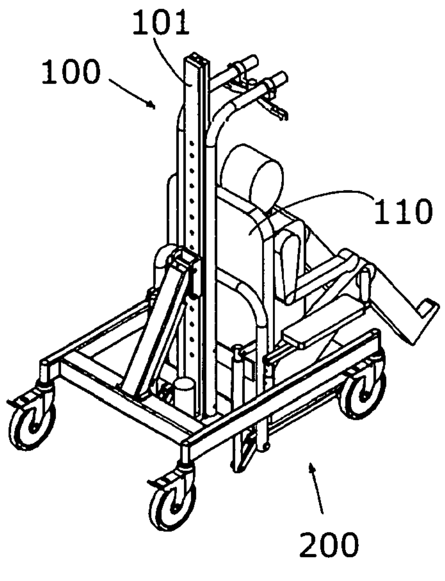

FIGS. 19A-19D illustrate the height adjustment of the lift system 100'. As shown in FIGS. 19A-19D, the back panel 110 together with the seat panel 111 can be adjusted to move along the support column 101 to different height levels relative to the wheeled frame 200' from positions proximate or adjacent the floor, see FIGS. 19C and D, and elevated well above the floor, as shown in FIG. 19B.

Figure 20:
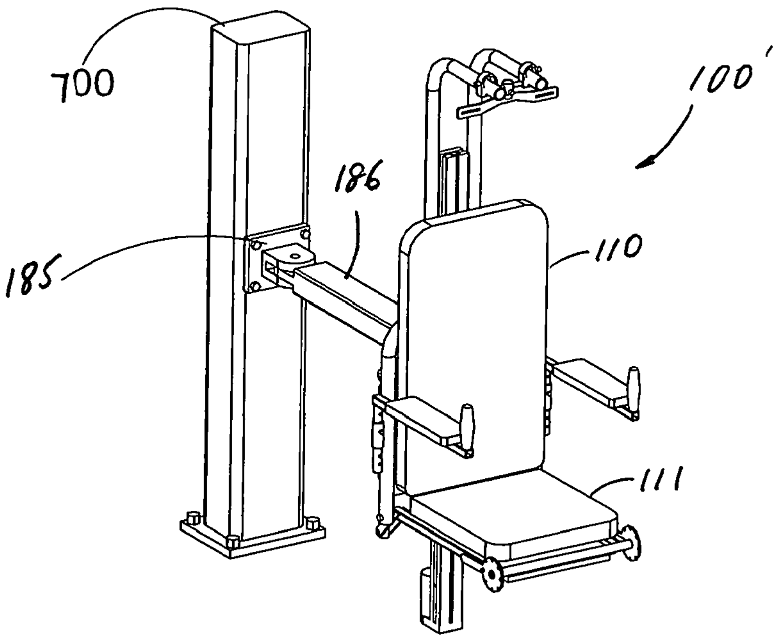
FIG. 20 illustrates the lift system mounted on a pole.
Figure 21:
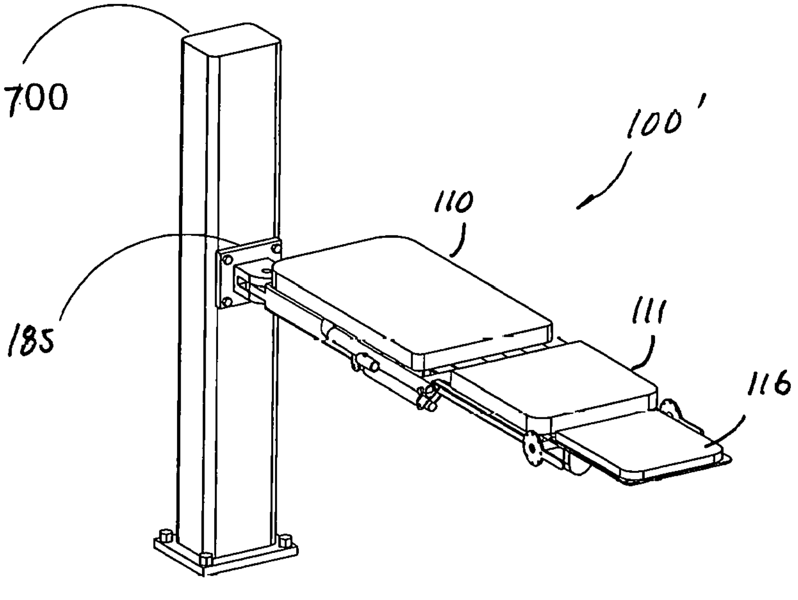
FIG. 21 illustrates the lift system mounted on a pole with the back panel, seat panel and the leg rest horizontally oriented.

FIG. 20 illustrates the lift system 100' mounted on a pole 700 via a lift arm 186. As the lift system 100' can be detached from the wheeled frame 200', the lift system 100' can be mounted on the pole 700. The lift system 100' can be rotated relative to the pole 700 using a pivot joint 185, for example. FIG. 21 illustrates the lift system 100' mounted on the pole 700 with the back panel 110, seat panel 111 and the leg rest 116 horizontally oriented. According to embodiments of the present invention, the back panel 110, the seat panel 111, the leg supports 160 and 161, the leg rest 116 and the arm supports 120 can be adjusted in many different ways to accommodate a user in various postures.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A lift system, for use by individuals, connected to a wheeled frame riding atop a floor, said lift system comprising:

a support column;

a slider slidably mounted on the support column;

a back panel attached to the slider providing independent linear movement of the back panel along the support column such that the back panel can be positioned along the support column at locations close to the floor and an elevated standing height when said support column is oriented vertically;

a seat panel pivotably mounted on the back panel for independent pivotal movement of the seat panel in relation to the back panel; said independent linear movement of the slider along the support column providing seat panel positions along the support column close to the floor, with the seat panel being parallel to the floor, to standing height; and said lift system further comprising:

a lift attachment joint attached to the support column at a mid-point along said support column;

a support member having a first end connected to the lift attachment joint and a second end connected to said wheeled frame;

said lift attachment joint having a lift attachment bracket allowing said support column to tilt back about said lift attachment joint; and a leg support pivotably connected to the seat panel, the leg support adjustable between a folded position and an extended position relative to the seat panel to support sitting, laying, standing postures or walking posture.

2. The lift system of claim 1 further comprising:

a pair of arm supports mounted on the back panel, the arm supports adjustable between an extended position substantially perpendicular to the back panel and a folded position substantially parallel to the back panel.

3. The lift system of claim 1 further comprising:

a harness support arm attached to the back panel near the first panel end; and a harness support connected to the harness support arm, the harness support arranged for attachment of a suspension support strap.

4. A lift system, for use by individuals, connected to a wheeled frame riding atop a floor, said lift system comprising:

a support column;

a slider slidably mounted on the support column;

a back panel attached to the slider providing independent linear movement of the back panel along the support column such that the back panel can be positioned along the support column at locations close to the floor and an elevated standing height when said support column is oriented vertically; and a seat panel pivotably mounted on the back panel for independent pivotal movement of the seat panel in relation to the back panel; said independent linear movement of the slider along the support column providing seat panel positions along the support column close to the floor, with the seat panel being parallel to the floor, to standing height:

said lift system further comprising:

a lift attachment joint attached to the support column at a mid-point along said support column;

a support member having a first end connected to the lift attachment joint and a second end connected to a said wheeled frame; and a leg support pivotably connected to the seat panel, the leg support adjustable between a folded position and an extended position relative to the seat panel to support sitting, laying, standing postures or walking posture.

* * * * *